(12) United States Patent
Pal et al.

(10) Patent No.: US 10,053,886 B2
(45) Date of Patent: Aug. 21, 2018

(54) CONNECTION ASSEMBLY FOR WIND TURBINE TOWER

(71) Applicant: General Electric Company, Schenectady, NY (US)

(72) Inventors: Sujan Kumar Pal, Bangalore (IN); Biju Nanukuttan, Bangalore (IN); Pranesh Attikodige Chandrashekhara, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/363,338

(22) Filed: Nov. 29, 2016

(65) Prior Publication Data
US 2018/0148949 A1    May 31, 2018

(51) Int. Cl.
*E04B 1/48* (2006.01)
*F03D 13/20* (2016.01)
(Continued)

(52) U.S. Cl.
CPC .............. *E04H 12/08* (2013.01); *E04B 1/48* (2013.01); *F03D 13/20* (2016.05); *F16B 5/045* (2013.01);
(Continued)

(58) Field of Classification Search
CPC ....... E04H 12/08; E04H 12/085; E04H 12/34; F03D 13/10; F03D 13/20; Y02E 10/728;
(Continued)

(56) References Cited

U.S. PATENT DOCUMENTS 4,442,153 A * 4/1984 Meltsch .................. B29C 61/10
                                                      138/156
6,094,881 A    8/2000 Lockwood
(Continued)

FOREIGN PATENT DOCUMENTS

DE    11 2010 005 382 T5    1/2013
WO          92/01850 A1    2/1992

OTHER PUBLICATIONS

Extended European Search Report and Opinion issued in connection with corresponding EP Application No. 17203379.7 dated Apr. 19, 2018.

*Primary Examiner* — Ryan D Kwiecinski
(74) *Attorney, Agent, or Firm* — Dority & Manning, P.A.

(57) ABSTRACT

A connection assembly for a tower of a wind turbine is provided. The connection assembly includes a first tower section segment having an inner surface spaced apart from an outer surface. A second tower section segment is positioned adjacent to the first tower section segment and includes an inner surface spaced apart from an outer surface. The first tower section segment and the second tower section segment define a vertically extending gap therebetween. A connector plate includes a first connector plate portion, a second connector plate portion spaced apart from the first connector plate portion, and a third connector plate portion positioned between the first connector plate portion and the second connector plate portion. The first connector plate portion couples to the first tower section segment. The second connector plate portion couples to the second tower section segment. The third connector plate portion extends through the vertically extending gap.

12 Claims, 7 Drawing Sheets

(51) Int. Cl.
  *E04H 12/08* (2006.01)
  *F16B 5/04* (2006.01)
  *F16B 5/12* (2006.01)
  *E04B 1/24* (2006.01)
(52) U.S. Cl.
  CPC ........ *F16B 5/12* (2013.01); *E04B 2001/2415* (2013.01)
(58) Field of Classification Search
  CPC . E04B 1/40; E04B 1/48; E04B 1/2604; E04B 1/2608; E04B 2001/2644; F05B 2240/912; B62D 33/046; F16B 5/04; F16B 5/045; F16B 5/12; F16B 5/123; F16B 5/125
  See application file for complete search history.

(56) References Cited

U.S. PATENT DOCUMENTS

| | | | | |
|---|---|---|---|---|
| 6,578,902 B2* | 6/2003 | Sill | ............ | B62D 25/02 296/186.1 |
| 6,715,243 B1* | 4/2004 | Fons | ............ | E04H 7/30 220/4.12 |
| 7,152,912 B1* | 12/2006 | Roush | ............ | B62D 29/045 296/186.1 |
| 7,464,512 B1* | 12/2008 | Perina | ............ | E04H 12/08 52/651.01 |
| 7,802,412 B2 | 9/2010 | Jensen | | |
| 8,291,664 B2* | 10/2012 | Hanig | ............ | B65D 90/022 220/4.33 |
| 8,316,615 B2* | 11/2012 | Haridasu | ............ | E04H 12/085 52/745.17 |
| 9,097,003 B1* | 8/2015 | Sultan | ............ | B64C 1/069 |
| 9,242,591 B2* | 1/2016 | Ehrlich | ............ | B60P 7/0807 |
| 2005/0241253 A1* | 11/2005 | Song | ............ | B62D 33/046 52/578 |
| 2007/0294955 A1* | 12/2007 | Sportel | ............ | E04H 12/08 52/40 |
| 2008/0256892 A1* | 10/2008 | Franke | ............ | E04H 12/08 52/655.1 |
| 2009/0021019 A1* | 1/2009 | Thomsen | ............ | E04H 12/085 290/55 |
| 2010/0071275 A1* | 3/2010 | Mathai | ............ | E04H 12/08 52/40 |
| 2014/0053500 A1* | 2/2014 | Lassiter | ............ | H01Q 1/1242 52/831 |
| 2014/0334868 A1* | 11/2014 | Apfel | ............ | C08K 3/10 403/267 |
| 2015/0061295 A1* | 3/2015 | Bjerg | ............ | H02K 5/04 290/55 |
| 2015/0075101 A1* | 3/2015 | Semaan | ............ | E04H 12/08 52/514 |
| 2015/0291273 A1* | 10/2015 | Elze | ............ | B64C 1/069 244/120 |
| 2015/0322988 A1* | 11/2015 | Busby | ............ | B64C 1/12 244/131 |
| 2016/0211574 A1* | 7/2016 | Dundorf | ............ | H01Q 1/42 |
| 2017/0122292 A1* | 5/2017 | Michel | ............ | F03D 13/20 |
| 2017/0254104 A1* | 9/2017 | Neighbor | ............ | E04H 12/08 |
| 2018/0087287 A1* | 3/2018 | Gremling | ............ | E04H 12/342 |
| 2018/0142490 A1* | 5/2018 | Eblen | ............ | E04H 12/2292 |

* cited by examiner

CONNECTION ASSEMBLY FOR WIND TURBINE TOWER

FIELD OF THE TECHNOLOGY

The present disclosure generally relates to wind turbines. More particularly, the present disclosure relates to connection assemblies for towers of wind turbines.

BACKGROUND

Wind power is considered one of the cleanest, most environmentally friendly energy sources presently available, and wind turbines have gained increased attention in this regard. A modern wind turbine typically includes a tower, a nacelle mounted on the tower, a generator positioned in the nacelle, and one or more rotor blades. The one or more rotor blades convert the kinetic energy of wind into mechanical energy using known airfoil principles. A shaft transmits the mechanical energy from the rotor blades to the generator. The generator then converts the mechanical energy to electrical energy that may be supplied to a utility grid.

The tower may be constructed from a plurality of tower sections. In particular, each of the tower sections may be stacked, e.g., vertically, and coupled together to form the tower. Each of the tower sections may, in turn, be formed from a plurality of tower section segments. Specifically, the tower section segments may be annularly arranged and coupled together to form the tower section.

Each pair of adjacent tower section segments may be coupled by a connection assembly. More specifically, conventional connection assemblies may include a flange welded to each tower section segment being coupled. A spacer may then be positioned between the flanges before coupling the flanges with bolts. Furthermore, it may be necessary to place a filler material in the joint between the adjacent tower section segments. In this respect, the assembly of the tower section using conventional connection assemblies may be time-consuming, thereby increasing the cost of the wind turbine.

Accordingly, improved wind turbines, and, in particular, improved connection assemblies for wind turbine towers, are desired in the art. Specifically, connection assemblies that do not require the use of spacers and/or filler materials and that are relatively more efficient to use would be advantageous.

BRIEF DESCRIPTION OF THE TECHNOLOGY

Aspects and advantages of the technology will be set forth in part in the following description, or may be obvious from the description, or may be learned through practice of the technology.

In one aspect, the present disclosure is directed to a connection assembly for a tower of a wind turbine. The connection assembly includes a first tower section segment having an inner surface spaced apart from an outer surface. A second tower section segment is positioned adjacent to the first tower section segment and includes an inner surface spaced apart from an outer surface. The first tower section segment and the second tower section segment define a vertically extending gap therebetween. A connector plate includes a first connector plate portion, a second connector plate portion spaced apart from the first connector plate portion, and a third connector plate portion positioned between the first connector plate portion and the second connector plate portion. The first connector plate portion couples to the first tower section segment. The second connector plate portion couples to the second tower section segment. The third connector plate portion extends through the vertically extending gap.

In another aspect, the present disclosure is directed to a wind turbine having a nacelle and a rotor coupled to the nacelle. The rotor includes a hub and at least one rotor blade extending from the hub. A tower supports the nacelle and includes a first tower section segment having an inner surface spaced apart from an outer surface. A second tower section segment is positioned adjacent to the first tower section segment. The second tower section segment includes an inner surface spaced apart from an outer surface. The first tower section segment and the second tower section segment define a vertically extending gap therebetween. A connector plate includes a first connector plate portion, a second connector plate portion spaced apart from the first connector plate portion, and a third connector plate portion positioned between the first connector plate portion and the second connector plate portion. The first connector plate portion couples to the first tower section segment. The second connector plate portion couples to the second tower section segment. The third connector plate portion extends through the vertically extending gap.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended FIGS., in which.

Repeat use of reference characters in the present specification and drawings is intended to represent the same or analogous features or elements of the present technology.

DETAILED DESCRIPTION OF THE TECHNOLOGY

Reference will now be made in detail to present embodiments of the technology, one or more examples of which are illustrated in the accompanying drawings. The detailed description uses numerical and letter designations to refer to features in the drawings. Like or similar designations in the drawings and description have been used to refer to like or similar parts of the technology. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Each example is provided by way of explanation of the technology, not limitation of the technology. In fact, it will be apparent to those skilled in the art that modifications and variations can be made in the present technology without departing from the scope or spirit thereof. For instance, features illustrated or described as part of one embodiment may be used on another embodiment to yield a still further embodiment. Thus, it is intended that the present technology covers such modifications and variations as come within the scope of the appended claims and their equivalents.

Figure 1:
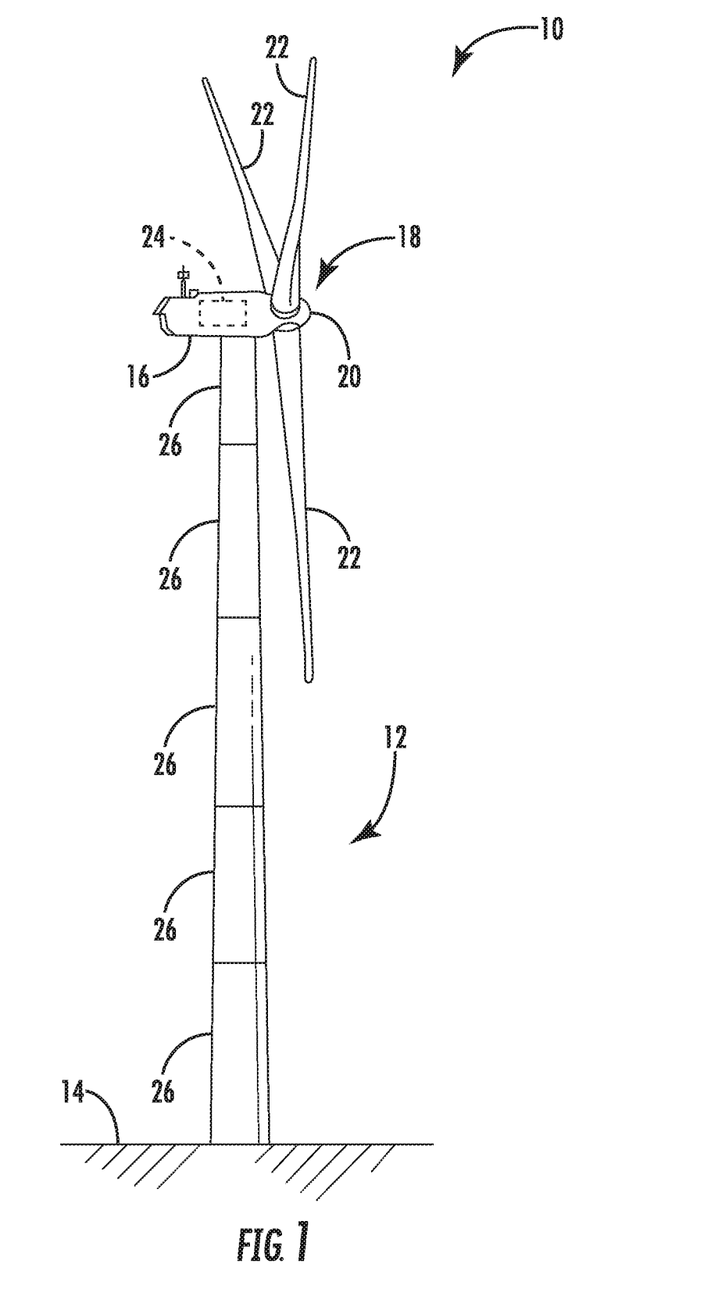
FIG. 1 is a perspective view of an exemplary wind turbine in accordance with embodiments of the present disclosure.

Referring now to the drawings, FIG. 1 illustrates a perspective view of one embodiment of an exemplary wind turbine 10 in accordance with the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the embodiment shown in FIG. 1, the rotor 18 includes three rotor blades 22. In alternative embodiments, however, the rotor 18 may include more or less than three rotor blades 22. Each rotor blade 22 may be spaced about the hub 20 to facilitate rotating the rotor 18 to convert kinetic energy from the wind into usable mechanical energy, and subsequently, electrical energy. For instance, the hub 20 may be rotatably coupled to an electric generator 24 positioned within the nacelle 16.

As shown in FIG. 1, the tower 12 may include a plurality of tower sections 26. In particular, the tower sections 26 are stacked (e.g., vertically) and coupled together so that the tower 12 positions the nacelle 16 a desired distance away from the support surface 14. In the embodiment shown in FIG. 1, the tower 12 includes five tower sections 26. Alternate embodiments of the tower 12, however, may include more or less than five tower sections 26.

Figure 2:
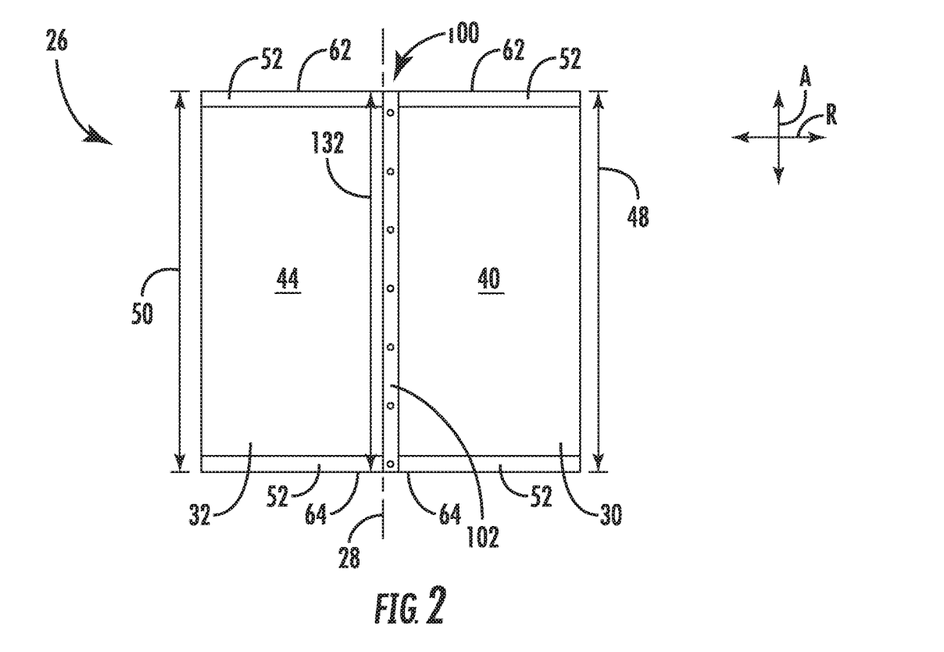
FIG. 2 is a front view of a tower section of a tower of the wind turbine in accordance with embodiments of the present disclosure.
Figure 3:
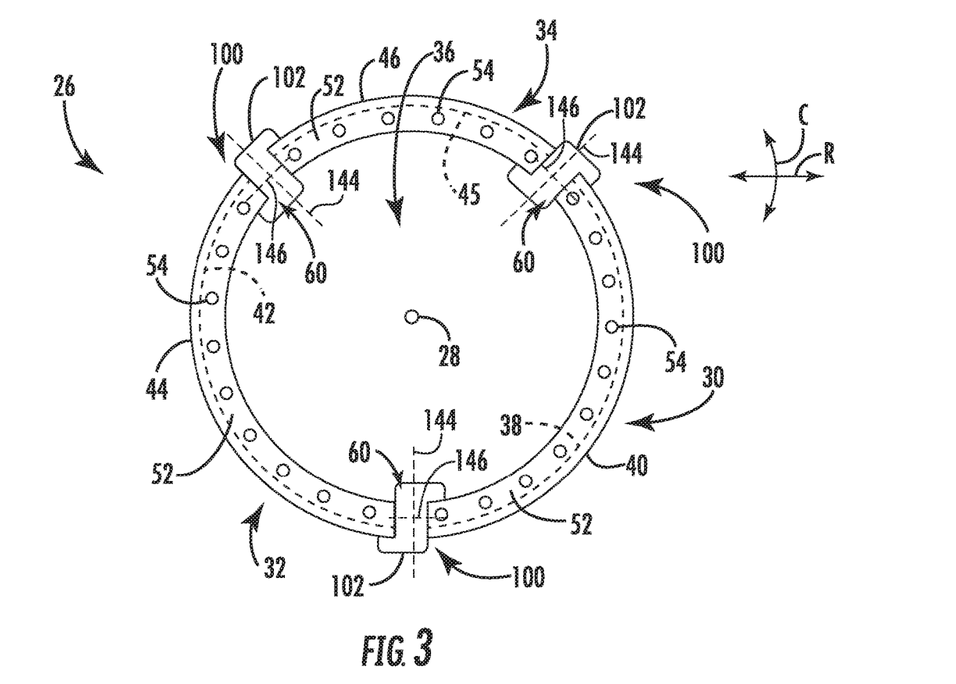
FIG. 3 is a top view of the tower section, illustrating a plurality of tower section segments in accordance with embodiments of the present disclosure.

FIGS. 2 and 3 illustrate one of the tower sections 26 shown in FIG. 1 in greater detail. Specifically, FIG. 2 is a front view of one of the tower sections 26, and FIG. 3 is a top view of one of the tower sections 26. As shown, the tower section 26 defines an axial centerline 28 that extends therethrough. In this respect, the tower section 26 defines an axial direction A, a radial direction R, and a circumferential direction C. In general, the axial direction A extends parallel to the axial centerline 28, the radial direction R extends orthogonally outward from the axial centerline 28, and the circumferential direction C extends concentrically around the axial centerline 28.

The tower section 26 may be formed from a plurality of tower section segments. In the embodiment shown in FIGS. 2 and 3, the tower section 26 includes a first tower section segment 30, a second tower section segment 32, and a third tower section segment 34. As best illustrated in FIG. 3, the first, second, and third tower section segments 30, 32, 34 are arranged in a generally annular array about the axial centerline 28 and are radially spaced apart from the axial centerline 28. In this respect, the tower section 26 defines an interior space 36 through which, e.g., wiring (not shown) coupling the electric generator 24 to a power grid (not shown) may extend and in which wind turbine equipment and platforms may be positioned. In alternate embodiments, however, the tower section 26 may have more or less than three tower section segments.

Figure 4:
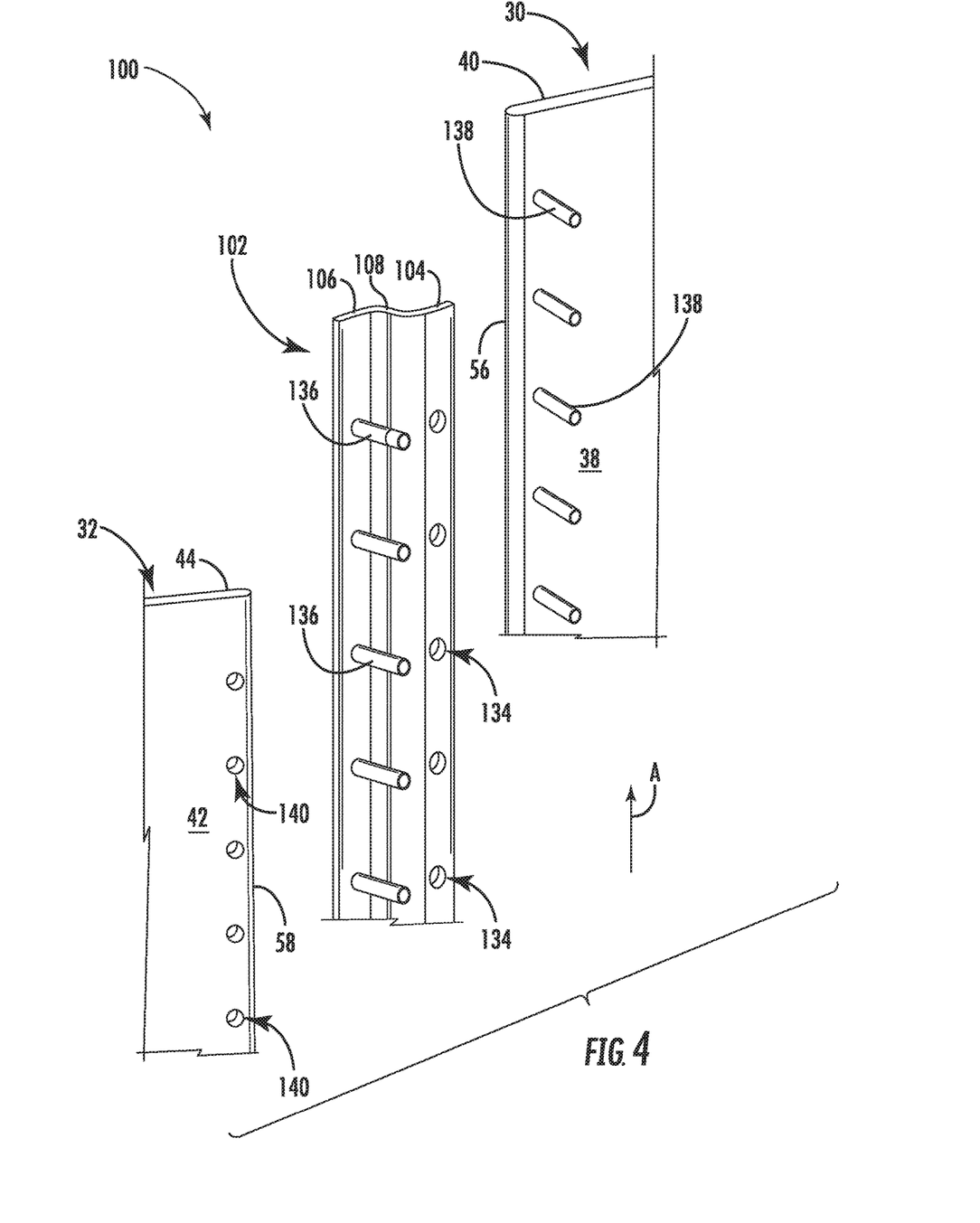
FIG. 4 is an exploded perspective view of one embodiment of a connection assembly for coupling adjacent tower section segments in accordance with embodiments of the present disclosure.

Each tower section segment includes inner and outer surfaces. In the embodiment shown in FIGS. 2 and 3, the first tower section segment 30 includes an inner surface 38 radially spaced apart from an outer surface 40. The second tower section segment 32 similarly includes an inner surface 42 radially spaced apart from an outer surface 44. The third tower section segment 34 similarly includes an inner surface 45 radially spaced apart from an outer surface 46. As shown, the outer surfaces 40, 44, 46 of the first, second, and third tower section segments 30, 32, 34 are radially aligned with each other. Similarly, the inner surfaces 38, 42, 45 of the first, second, and third tower section segments 30, 32, 34 are radially aligned with each other. Furthermore, the inner surfaces 38, 42, 45 demarcate the radially outer boundary of the interior space 36 defined by the tower section 26. The edges of the tower section segments may rectangular as shown in FIG. 3 or rounded as shown in FIG. 4.

The first, second, and third tower section segments 30, 32, 34 may extend for the entire length of the tower section 26 in the axial direction A. As shown in FIG. 2, the first tower section segment 30 defines an axial length 48. Similarly, the second tower section segment 32 defines an axial length 50. Although not shown, the third tower section segment 34 also defines an axial length. In an exemplary embodiment, the axial lengths 48, 50 are equal.

As best illustrated in FIG. 3, each of the first, second, and third tower section segments 30, 32, 34 may include one or more flanges 52. In certain embodiments, one flange 52 may be positioned at each axial end, e.g., a top end 62 and a bottom end 64 (FIG. 2), of the first, second, and third tower section segments 30, 32, 34. Each flange 52 generally extends radially inward and defines one or more mounting apertures 54 that may receive fasteners, such as bolts or other suitable mechanical fasteners. In this respect, the fasteners may couple each flange 52 of the first, second, and third tower section segments 30, 32, 34 to a mating flange on a corresponding tower section segment of an adjacent tower section 26. For example, the flange 52 on the top end of the first tower section segment 30 shown in FIG. 3 may couple to a flange on the bottom end of one of the tower section segments of an adjacent tower section 26.

As shown in FIG. 3, a connection assembly 100 couples each adjacent pair of the tower section segments. In particular, one connection assembly 100 couples the first and second tower section segments 30, 32. Another connection assembly 100 couples the second and third tower section segments 32, 34. A further connection assembly 100 couples the first and third tower section segments 30, 34. Although the embodiment shown in FIG. 3 includes three connection assemblies 100, alternate embodiments of the tower section 26 may include more or less than three connection assemblies 100 depending on the number of tower section segments.

Figure 5:
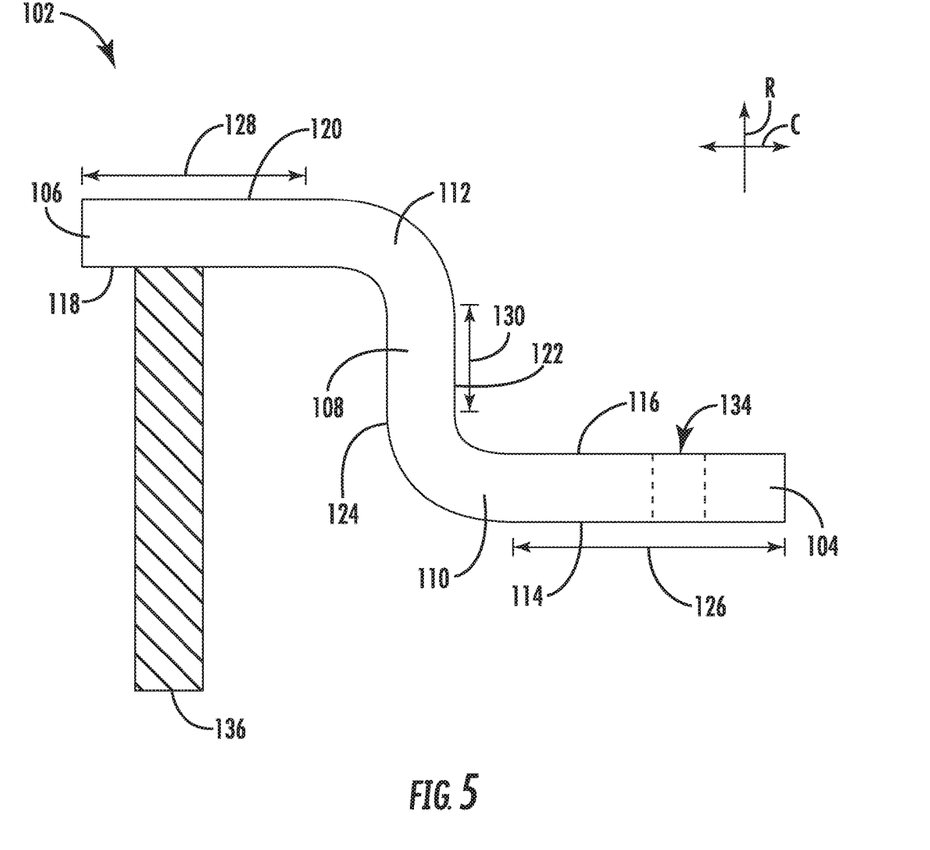
FIG. 5 is a top view of a connector plate of the connection assembly in accordance with embodiments of the present disclosure.
Figure 6:
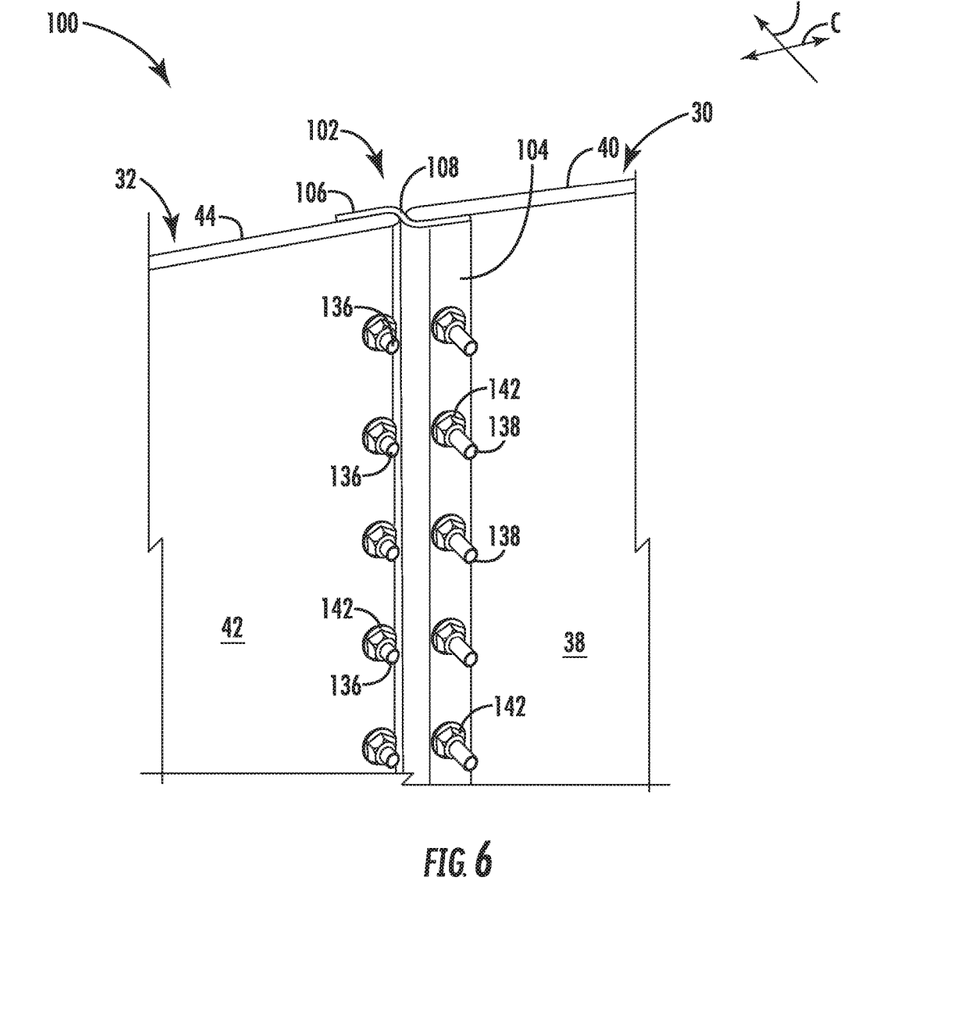
FIG. 6 is an assembled perspective view of the embodiment of the connection assembly shown in FIG. 4 in accordance with embodiments of the present disclosure.

FIGS. 4-6 illustrate one embodiment of the connection assembly 100.

More specifically, FIG. 4 is an exploded perspective view of the connection assembly 100. FIG. 5 is a top view of a connector plate 102 of the connection assembly 100. FIG. 6 is an assembled perspective view of the connection assembly 100.

The connection assembly 100 includes the connector plate 102, which couples a pair of adjacent tower section segments. In the embodiment shown in FIGS. 4-6, the connector plate 102 couples the first tower section segment 30 and the second tower section segment 32. Nevertheless, the connector plate 102 may also couple the second and third tower section segments 32, 34 or the first and third tower section segments 30, 34 as shown in FIG. 3.

The connector plate 102 includes a first connector plate portion 104, a second connector plate portion 106, and a third connector plate portion 108. As shown, the first connector plate portion 104 is spaced apart from the second connector plate portion 106, and the third connector plate portion 108 positioned between the first and second connector plate portions 104, 106. More specifically, the first and second connector plate portions 104, 106 are radially and circumferentially spaced apart. The third connector plate portion 108 is positioned radially and circumferentially between the first and second connector plate portions 104, 106. In this respect, the first and second connector plate portions 104, 106 may be oriented at an angle (e.g., a right angle) relative to the third connector plate portion 108. In the embodiment shown in FIGS. 4-6, a first arcuate portion 110 may couple the first and third connector plate portions 104, 108, and a second arcuate portion 112 may couple the second and third connector plate portions 106, 108. As such, the connector plate 102 may be S-shaped. For example, the S-shape of the bracket may conform to the rounded edges of the tower section segments. In alternate embodiments, however, the third connector plate portion 108 may extend from the first connector plate portion 104 to the second connector plate portion 106.

The connector plate 102 includes various surfaces. In the embodiment shown in FIG. 5, the first connector plate portion 104 includes a radially inner surface 114 radially spaced apart from a radially outer surface 116. Similarly, the second connector plate portion 106 includes a radially inner surface 118 radially spaced apart from a radially outer surface 120. The third connector plate portion 108 includes a first circumferential surface 122 circumferentially spaced apart from a second circumferential surface 124. In alternate embodiments, the connector plate 102 may have different surfaces.

The connector plate 102 also defines various lengths. As shown in FIG. 5, the first connector plate portion 104 defines a circumferential length 126. Similarly, the second connector plate portion 106 defines a circumferential length 128. In particular embodiments, the circumferential lengths 126, 128 of the first and second connector plate portions 104, 106 may generally be the same. The third connector plate portion 108 defines a radial length 130, which may be shorter than circumferential lengths 126, 128 of the first and second connector plate portions 104, 106. In alternate embodiments, there may be any suitable relationship between the circumferential length 126 of the first connector plate portion 104, the circumferential length 128 of second connector plate portion 106, the radial length 130 of the third connector plate portion 108, and/or the axial length 132 of the connector plate 102. As shown in FIG. 2, the connector plate 102 also defines an axial length 132. The axial length 132 of the connector plate 102 may be the same as the axial lengths 48, 50 of the first and second tower section segments 30, 32. In alternate embodiments, however, the axial length 132 of the connector plate 102 may be less than the axial lengths 48, 50 of the first and second tower section segments 30, 32. In such embodiments, spacers (not shown) may be used to fill any gaps created by the disparate lengths of the connector plate 102 and the first and second tower section segments 30, 32.

As shown in FIGS. 4 and 5, the first connector plate portion 104 may define a plurality of mounting apertures 134 extending therethrough. Specifically, each of the mounting apertures 134 may extend from the radially inner surface 114 through the radially outer surface 116 of the first connector plate portion 104. As shown, the mounting apertures 134 are axially spaced apart and circumferentially aligned. In the embodiment shown in FIG. 4, the first connector plate portion 104 defines five mounting apertures 134. Although, the first connector plate portion 104 may have more or less than five mounting apertures 134 in alternate embodiments. In alternate embodiments, the mounting apertures 134 may refer to any mounting apertures defined by any portion of the connector plate 102.

The second connector plate portion 106 may include a plurality of studs 136 as shown in FIGS. 4-6. In particular, the studs 136 may be axially spaced apart and circumferentially aligned. Furthermore, the studs 136 may extend radially inward (i.e., toward the axial centerline 28 shown in FIGS. 2 and 3) from the radially inner surface 118 of the second connector plate portion 106. In the embodiment shown in FIGS. 4 and 5, the second connector plate portion 102 includes five studs 136. Although, the second connector plate portion 106 may have more or less than five studs 136 in alternate embodiments. The studs 136 may be integral with the second connector plate portion 106. Furthermore, the studs 136 may be threaded. In alternate embodiments, the studs 136 may refer to any studs on any portion of the connector plate 102.

In some embodiments, the connector plate 102 may be integrally formed. That is, the first, second, and third connector plate portions 104, 106, 108 are formed as a single component. In alternate embodiments, however, the connector plate 102 may be formed as a plurality of separate components. In some embodiments, the connector plate 102 may be formed as two separate L-shaped pieces that are coupled together via fasteners, welding, or any other suitable method. For example, one L-shaped piece may include the first connector plate portion 104 and a portion of the third connector plate portion 108. The other L-shaped piece may include the second connector plate portion 106 and a portion of the third connector plate portion 108. In this respect, the third connector plate portion 108 may be divided along a radially extending line 144 or a circumferentially extending line 146 shown in FIG. 3.

As mentioned above, the connector plate 102 may couple the first and second tower section segments 30, 32. In this respect, the first tower section segment 30 includes a plurality of studs 138 in the embodiment shown in FIG. 4. As will be discussed in greater detail below, the studs 138 extend through the mounting apertures 134 defined by the first connector plate portion 104. As shown, each of the studs 138 extends radially inward (i.e., toward the axial centerline 28 shown FIGS. 2 and 3) from the inner surface 38 of the first tower section segment 30. The studs 138 are axially spaced apart and circumferentially aligned proximate to an edge 56 of the first tower section segment 30 so as to align with the mounting apertures 134. In general, the first tower section segment 30 includes as many studs 138 as the first connector plate portion 104 defines mounting apertures 134. In this respect, the first tower section segment 30 includes five studs 138 in the embodiment shown in FIGS. 4 and 6. Although, the first tower section segment 30 may have more or less than five studs 138 in alternate embodiments. The studs 138 may be integral with the first tower section segment 30. Furthermore, the studs 138 may be threaded. In alternate embodiments, the studs 138 may refer to any studs on any tower section segment.

The second tower section segment 32 defines a plurality of mounting apertures 140 extending therethrough that receive the studs 136 on the second connector plate portion 106. Specifically, each of the mounting apertures 140 extends from the inner surface 42 of the second tower section segment 32 through the outer surface 44 of the second tower section segment 32. The mounting apertures 140 are axially spaced apart and circumferentially aligned proximate to an edge 58 of the second tower section segment 32 so as to align with the studs 136 on the second connector plate portion 104. In general, the second tower section segment 32 defines as many mounting apertures 140 as the second connector plate portion 106 includes studs 136. In this respect, the second tower section segment 32 defines five mounting apertures 140 in the embodiment shown in FIG. 4. Although, the second tower section segment 32 may have more or less than five mounting apertures 140 in alternate embodiments. In alternate embodiments, the mounting apertures 140 may refer to any mounting apertures defined be any tower section segment that extend from the radially inner surface thereof through the radially outer surface thereof.

As mentioned above, FIG. 6 illustrates the connection assembly 100 shown in FIG. 4 after assembly thereof. As shown, the first connector plate portion 104 couples to the first tower section segment 30, and the second connector plate portion 106 couples to the outer surface of the second tower section segment 32. More specifically, the radially outer surface 116 of the first connector plate portion 104 contacts the radially inner surface 38 of first tower section segment 30. In this respect, each of the plurality of studs 138 on the first tower section segment 30 extends through one of the mounting apertures 134 in the first connector plate portion 104. Similarly, the radially inner surface 118 of the second connector plate portion 106 contacts the radially outer surface 44 of second tower section segment 32. As such, each of the plurality of studs 136 on the second connector plate portion 106 extends through one of the mounting apertures 140 in the second tower section segment 32. A fastener 142 (e.g., a nut) may threadingly engage each of the studs 136, 138 to couple the first tower section segment 30, the connector plate 102, and the second tower section segment 32. Furthermore, the third connector plate portion 108 is positioned in and extends through a vertically extending gap 60 (FIG. 2) defined between the first and second tower section segments 30, 32. In certain embodiments, the connector plate 102 may be coupled to one of the first or second tower section segments prior to onsite assembly of the tower section to reduce assembly time.

As shown in FIG. 6, a portion of the connector plate 102 is positioned inside of the tower 12 and a portion of the connector plate 102 is positioned outside of the tower 12. In particular, the first connector plate portion 104 is positioned radially inward from the first and second tower section segments 30, 32 (i.e., in the interior space 36). Conversely, the second connector plate portion 104 is positioned radially outward from the first and second tower section segments 30, 32. Nevertheless, fasteners 142 may be installed onto all of the studs 136, 138 from inside of the tower 12 in the embodiment shown in FIGS. 4-6. That is, the studs 136, 138 extend radially inward from the connector plate 102 and the first tower section segment 30, thereby permitting the fasteners 142 to threadingly engage the studs 136, 138 from within the interior space 36.

Figure 7:
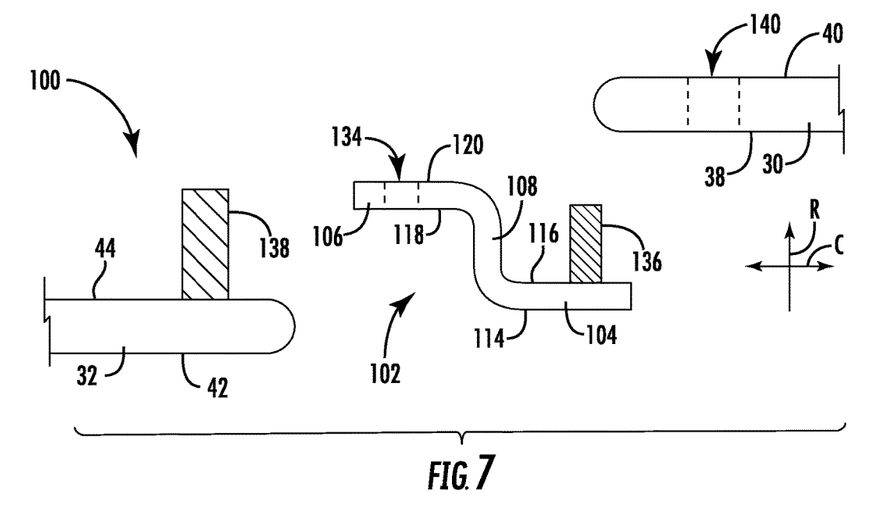
FIG. 7 is an exploded top view of another embodiment of the connection assembly for coupling adjacent tower section segments in accordance with embodiments of the present disclosure.

FIG. 7 is an exploded top view of an alternate embodiment of the connection assembly 100. More specifically, the studs 136 extend radially outward (i.e., away from the axial centerline 28) from the radially outer surface 116 of the first connector plate portion 104. The second connector plate portion 106 defines the mounting apertures 134. In this respect, the first tower section segment 30 defines the mounting apertures 140 extending therethrough, while the studs 138 extend radially outward from the second tower section segment 32. Each of studs 138 on the second tower section segment 32 extends through one of the mounting apertures 134 in the second connector plate portion 106. Furthermore, each of studs 136 on the first connector plate portion 104 extends through one of the mounting apertures 140 in the first tower section segment 30. The fasteners 142 may threadingly engage each of the studs 136, 138 from outside of the tower 12.

Figure 8:
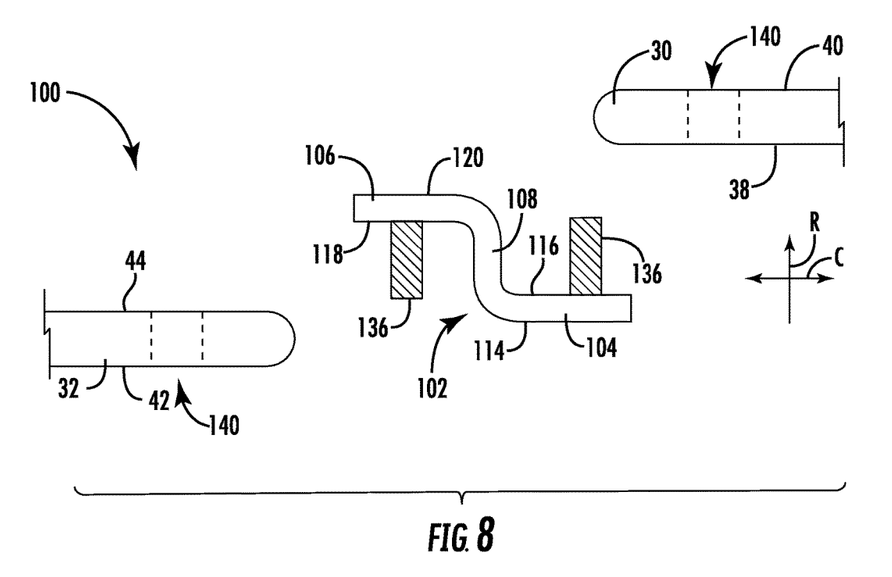
FIG. 8 is an exploded top view of further embodiment of the connection assembly for coupling adjacent tower section segments in accordance with embodiments of the present disclosure.

FIG. 8 is an exploded top view of a further embodiment of the connection assembly 100. More specifically, the studs 136 extend radially outward from the radially outer surface 116 of the first connector plate portion 104 and radially inward from the radially inner surface 118 of the second connector plate portion 106. In this respect, the first and second tower section segments 30, 32 define the mounting apertures 140. Each of studs 136 on the first and second connector plate portions 104, 106 extends through one of the mounting apertures 140 in the first and second tower section segments 30, 32. The fasteners 142 may threadingly engage each of the studs 136 on the second connector plate portion 106 from the interior space 36. Conversely, the fasteners 142 may threadingly engage each of the studs 136 on the first connector plate portion 104 from outside of the tower 12.

Figure 9:
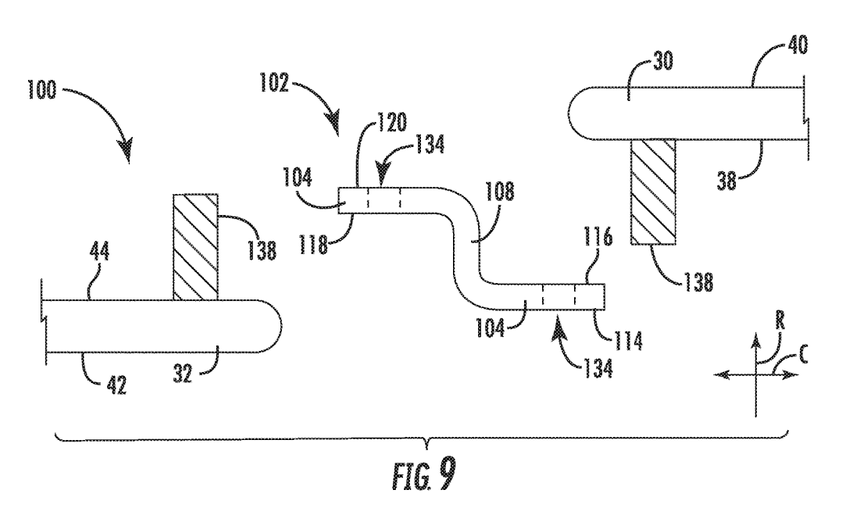
FIG. 9 is an exploded top view of yet another embodiment of the connection assembly for coupling adjacent tower section segments in accordance with embodiments of the present disclosure.

FIG. 9 is an exploded top view of yet another embodiment of the connection assembly 100. More specifically, the first and second connector plate portions 104, 106 define the mounting apertures 134. In this respect, the studs 138 extend radially inward from the radially inner surface 38 of the first tower section segment 30 and radially outward from the radially outer surface 44 of the second tower section segment 32. Each of studs 138 on the first and second tower section segments 30, 32 extends through one of the mounting apertures 134 in the first and second connector plate portions 104, 106. The fasteners 142 may threadingly engage each of the studs 136 on the first tower section segment 30 from the interior space 36. Conversely, the fasteners 142 may threadingly engage each of the studs 136 on the second tower section segment 32 from outside of the tower 12.

As discussed in greater detail above, the studs 136 extend outwardly from the connector plate 102, and the studs 138 extend outwardly from the first and/or second tower section segments 30, 32. The studs 136, 138 may be press-fit or welded to the connector plate 102 and/or second tower section segments 30, 32. Nevertheless, the studs 136, 138 may be coupled to the connector plate 102 and/or second tower section segments 30, 32 in a slide fit relationship (e.g., bolts) or any other suitable manner.

In the embodiments shown in FIGS. 4-9, various combinations of studs and fasteners couple the connector plate 102 to the first and second tower section segments 30, 32. In alternate embodiments, the connector plate 102 may be coupled to the first and second tower section segments 30, 32 in any suitable manner. For example, the connector plate 102 may be welded to the first and second tower section segments 30, 32. The welds may be inside or outside of the tower 12. As mentioned above, some embodiments of the connector plate 102 may be divided into two L-shaped portions along the circumferentially extending lined 146. In such embodiments, the fastener coupling the L-shaped portions may clamp the first and second tower section segments 30, 32 together, thereby creating a friction-based connection. In further embodiments, the connector plate 102 and the first and second tower section segments 30, 32 may be coupled via hemming, crimping, or any other suitable press-fit operation.

As discussed in greater detail above, the connection assembly 100 includes the connector plate 102, which couples adjacent tower section segments. In the embodiments shown in FIGS. 4-9, for example, the first connector plate portion 104 couples to the first tower section segment 30, and the second connector plate portion 106 couples to the second tower section segment 32. In this respect, the connection assembly 100 disclosed herein, unlike conventional connection assemblies, does not require positioning of a spacer and/or filler between flanges welded to the adjacent tower section segments. As such, the connection assembly 100 reduces the assembly time of the tower 12.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A connection assembly for a tower of a wind turbine, the connection assembly comprising:
   a first tower section segment comprising an inner surface spaced apart from an outer surface and a plurality of studs;
   a second tower section segment positioned adjacent to the first tower section segment, the second tower section segment comprising an inner surface spaced apart from an outer surface, the second tower segment defining a plurality of mounting apertures extending therethrough, wherein the first tower section segment and the second tower section segment define a vertically extending gap therebetween and at least partially define a tower interior; and
   a connector plate comprising a first connector plate portion, a second connector plate portion spaced apart from the first connector plate portion, and a third connector plate portion positioned between the first connector plate portion and the second connector plate portion, the first connector plate portion defining a plurality of mounting apertures, the second connector plate portion defining a plurality of studs;
   wherein the first connector plate portion couples to the first tower section segment, the second connector plate portion couples to the second tower section segment, and the third connector plate portion extends through the vertically extending gap, and
   wherein each of the plurality of studs on the first tower section segment extends through one of the plurality of apertures defined by the first connector plate portion and each of the plurality of studs on the second connector plate portion extends through one of the plurality of apertures defined by the second tower section segment.

2. The connection assembly of claim 1, wherein the first connector plate portion is radially spaced apart from the second connector plate portion, and wherein the first connector plate portion contacts the radially inner surface of the first tower section segment and the second connector plate portion contacts the radially outer surface to the second tower section segment.

3. The connection assembly of claim 2, wherein the third connector plate portion is oriented at angle relative to the first connector plate portion and the second connector plate portion.

4. The connection assembly of claim 2, wherein the connector plate is S-shaped.

5. The connection assembly of claim 1, wherein the first tower section segment comprises a vertical length, the second tower section segment comprises a vertical length, and the connector plate comprises a vertical length, and wherein the vertical length of the first tower section segment, the vertical length of the second tower section segment, and the vertical length of the connector plate are equal.

6. The connection assembly of claim 1, further comprising:
   a plurality of fasteners, each fastener engaging one of the plurality of studs on the first tower segment or one of the plurality of studs on the second connector plate portion such that the plurality of fasteners are positioned within the tower interior.

7. The connection assembly of claim 1, The connection assembly of claim 1, further comprising:
   a plurality of fasteners, each fastener engaging one of the plurality of studs on the first tower segment or one of the plurality of studs on the second connector plate portion such that the plurality of fasteners are positioned within the tower interior.

8. A wind turbine, comprising:
   a nacelle;
   a rotor coupled to the nacelle, the rotor comprising a hub and at least one rotor blade extending from the hub; and
   a tower supporting the nacelle, the tower comprising:
      a first tower section segment comprising an inner surface spaced apart from an outer surface and a plurality of studs;
      a second tower section segment positioned adjacent to the first tower section segment, the second tower section segment comprising an inner surface spaced apart from an outer surface, the second tower segment defining a plurality of mounting apertures extending therethrough, wherein the first tower section segment and the second tower section segment define a vertically extending gap therebetween; and
      a connector plate comprising a first connector plate portion, a second connector plate portion spaced apart from the first connector plate portion, and a third connector plate portion positioned between the first connector plate portion and the second connector plate portion, the first connector plate portion defining a plurality of mounting apertures, the second connector plate portion defining a plurality of studs;

wherein the first connector plate portion couples to the first tower section segment, the second connector plate portion couples to the second tower section segment, and the third connector plate portion extends through the vertically extending gap, and wherein each of the plurality of studs on the first tower section segment extends through one of the plurality of apertures defined by the first connector plate portion and each of the plurality of studs on the second connector plate portion extends through one of the plurality of apertures defined by the second tower section segment.

9. The wind turbine of claim 8, wherein the first connector plate portion is radially spaced apart from the second connector plate portion, and wherein the third connector plate portion is oriented at an angle relative to the first connector plate portion and the second connector plate portion.

10. The wind turbine of claim 8, wherein the first tower section segment comprises a vertical length, the second tower section segment comprises a vertical length, and the connector plate comprises a vertical length, and wherein the vertical length of the first t section segment, the vertical length of the second tower section segment, and the vertical length of the connector plate are the same.

11. The wind turbine of claim 8, wherein the third connector plate portion is oriented at angle relative to the first connector plate portion and the second connector plate portion.

12. The wind turbine of claim 8, wherein the connector plate is S-shaped.

* * * * *

UNITED STATES PATENT AND TRADEMARK OFFICE
CERTIFICATE OF CORRECTION

| | |
|---|---|
| PATENT NO. | : 10,053,886 B2 |
| APPLICATION NO. | : 15/363338 |
| DATED | : August 21, 2018 |
| INVENTOR(S) | : Sujan Kumar Pal et al. |

Page 1 of 1

It is certified that error appears in the above-identified patent and that said Letters Patent is hereby corrected as shown below:

In the Claims

In Claim 10, Column 12, Line 11 currently reads "vertical length of the first t section segment, the vertical" line should read "vertical length of the first tower section segment, the vertical."

Signed and Sealed this
Twenty-first Day of April, 2020

Andrei Iancu
*Director of the United States Patent and Trademark Office*